April 9, 1940.   J. V. THOMAS   2,196,279
GAS PRESSURE CONTROL SYSTEM
Filed Feb. 24, 1937   3 Sheets-Sheet 2

Inventor.
John V. Thomas.
Attorney.

Patented Apr. 9, 1940

2,196,279

UNITED STATES PATENT OFFICE 2,196,279

GAS PRESSURE CONTROL SYSTEM

John V. Thomas, Altadena, Calif., assignor to Natural Gas Equipment Inc., Los Angeles, Calif., a corporation of California Application February 24, 1937, Serial No. 127,436

3 Claims. (Cl. 137—153)

This invention pertains generally to regulators for controlling the operation or movement of one part or unit in a pressure controlled system, in accordance with variations in what may be termed a reference pressure; for example, to control the operation of a valve that regulates the flow through a gas or other fluid conducting line, in accordance with pressure variations of an extraneous fluid, or pressure variations in the fluid conducting line at the high pressure side of the valve. The invention is particularly concerned with apparatus of this character employing a pilot valve device that is responsive to variations in the reference pressure, and that regulates the operation of that part of the system ultimately to be controlled, by communicating thereto fluid pressure varying in accordance with changes in the reference pressure. Pressure control systems of this general type also comprise the subject matter of Patent No. 2,013,222, granted September 3, 1935, to me on Pressure control apparatus.

While the invention is capable of use for controlling the operation of systems of various types and character, it is particularly adapted for controlling the supply of gas to gas fired steam boilers, and will hereinafter be described as having its preferred use for that purpose. One of my primary objects is to provide a gas flow regulator capable of controlling with close precision all the various flow and pressure conditions in the gas stream required for the maintenance of proper boiler operation and control. In the operation of the usual regulator employed for this purpose, a valve in the burner gas supply line is made responsive to variations in the boiler steam pressure so as to increase the rate of gas feed to the burners when the steam pressure drops, and to close off or reduce the rate of gas supply to the burners when the steam pressure increases to a predetermined maximum. It is a characteristic of all boiler gas supply regulators of which I am aware, that the gas control valve is affected in its operation only by variations in the boiler steam pressure, and, consequently, that not until a given change in the system is manifested by an effect on the boiler operation, will the valve become responsive to make a compensating change in the rate of gas supply to the burners. While it retains the characteristic feature of controlling the main gas valve in accordance with changes in the boiler steam pressure, the invention differs from and improves upon the ordinary regulators in that it operates independently of the boiler steam pressure to control and maintain directly, certain limiting pressure conditions on the gas stream being fed to the burners.

In accordance with the invention, the present regulator operates directly (as distinguished from via the boiler steam pressure) to maintain a predetermined minimum pressure on the gas feed to the burners, and also to directly and immediately compensate for pressure changes in the supply line at the high pressure side of the valve that ordinarily would result in variations in the burner supply pressure. The regulator has the added feature of maintaining, independently of the boiler steam pressure, a predetermined maximum pressure on the burner supply gas. In addition to these features, the invention provides various improvements having particularly to do with the construction of the pilot valve, and which tend generally to improve the operation of the pilot valve with relation to the various other parts of the system.

The invention will be understood more fully and to better advantage from the following detailed description of the invention in certain typical and preferred forms. Throughout the description, reference is had to the accompanying drawings, in which.

Figure 1:
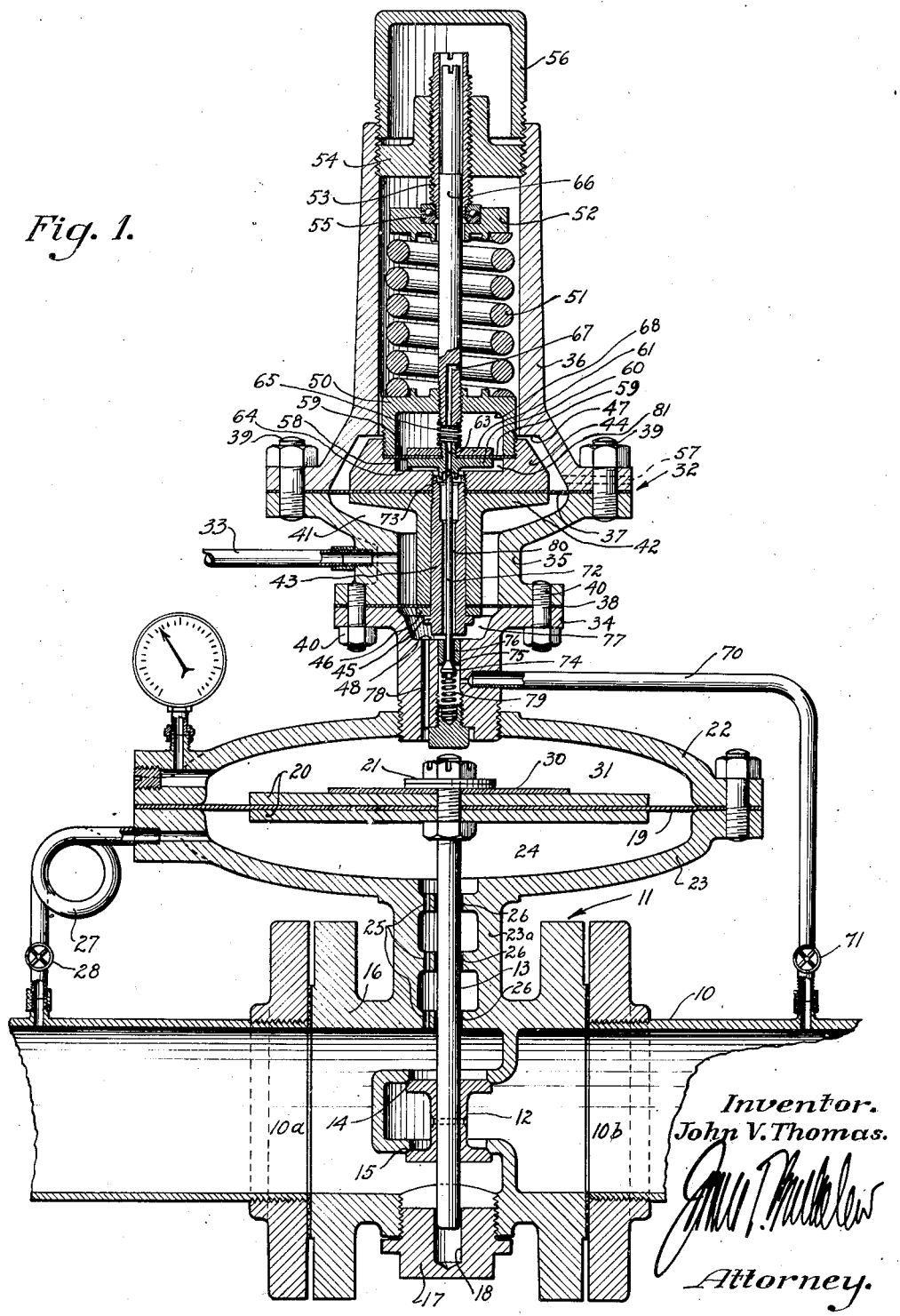
Fig. 1 is a sectional view showing one embodiment of the invention in the form of a regulator for controlling the flow and pressure of the fuel gas fed to boiler burners.
Figure 2:
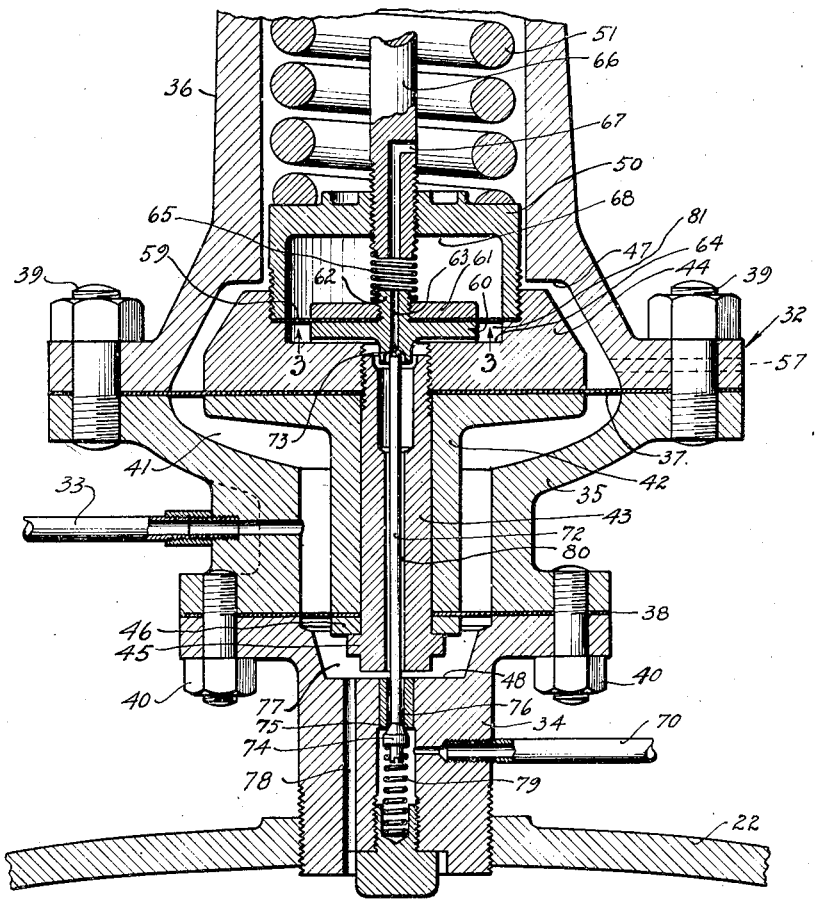
Fig. 2 is a fragmentary enlargement of the pilot valve mechanism.

For the purposes of description, the form of the invention illustrated in Fig. 1 will be assumed to connect with a steam boiler and to regulate the flow and pressure of the gas being fed to the boiler burners, in accordance with certain varying conditions, as later explained. While the apparatus of Fig. 1 has its preferred use for boiler fuel control, it will be understood that the apparatus is also capable of use to control the flow and pressure of fluid (including liquid) streams in other situations and for other purposes where corresponding or similar conditions obtain, and that the claims are to be construed accordingly. For the purpose assumed herein, the apparatus operates to control the flow of gas through line 10 to the boiler burners, not shown, in accordance with variations in the boiler steam pressure (the reference pressure), and also to maintain predetermined maximum and minimum pressures on the gas stream flowing to the burners.

The gas flow through the burner supply line 10 is controlled by a suitable valve, generally indicated at 11, preferably of a balanced type, and comprising the valve 12 carried on stem 13 and movable vertically with relation to seats 14 and 15 formed within and as an integral part of the valve body 16. Plug 17, having a bore 18 receiving the lower end of the valve stem 13, laterally supports and guides the stem in its vertical movement. Valve 12 is operated by fluid pressure applied to a main diaphragm 19 clamped between light-weight metal disks 20 to which the upper end of the valve stem is connected as at 21. Diaphragm 19 in turn is clamped between sections 22 and 23 of a hollow casing, the lower section 23 of which may conveniently be made as an integral part of the valve body 16.

The gas pressure at the outlet side 10a of the valve 12 is communicated to the under side of diaphragm 19 by way of a suitable passage connecting with chamber 24, for example through holes 25 drilled through annular projections 26 within the reduced portion 23a of the diaphragm casing and valve casting. It is desired to communicate to chamber 24 only the static pressure of the outlet gas, and it may therefore be necessary to compensate for any added pressure due to the velocity head of the gas as it passes at relatively high velocity beyond the valve opening 14 directly below passages 25. For this purpose the outlet side of the gas line may be connected at a suitable distance beyond the valve, with the diaphragm chamber by way of line 27, the latter containing a valve 28 that may be adjusted to restrict the communication sufficiently to avoid the transmission of pulsating pressures to the diaphragm. Either or both communications 25 and 27 may be employed for connecting the diaphragm chamber with the main flow line at the outlet side of the valve.

As will later appear, the valve 12 is normally caused to operate in response to variations in the boiler steam pressure through the intermediary of the pilot valve mechanism and the main diaphragm 19. It is desirable however that certain operations of the valve 12 be made independent of the boiler steam pressure, and that to meet certain conditions, the valve be caused to respond to pressure changes in the gas supply line 10 by direct pressure communication therefrom to the diaphragm 19, as distinguished from pressure changes in the boiler steam pressure that may result from pressure variations in the gas line. As an illustration, in the operation of the usual gas supply regulator, an abnormal pressure increase in the gas line at the inlet side of the main flow control valve, corresponding to valve 12, causes an increase of pressure at the outlet side of the valve, which is the burner feed pressure. This condition then continues until the resultant increase in the boiler steam pressure, due to the heavier firing, acts through the regulator to close the gas valve sufficiently for the restoration of normal pressure on the gas feeding the burners. In accordance with the invention, diaphragm 19 is made directly responsive to pressure changes in line 10, so that valve 12 is rendered immediately responsive without the control having to operate through the boiler itself, so to speak, as is ordinarily the case. The valve and its diaphragm also are made directly controllable by the pressure at the outlet side of the valve in such manner that the valve is caused automatically to maintain a predetermined minimum pressure on the gas being fed to the burners.

Assuming valve 12 to be open and a sudden pressure increase to occur in line 10 at the high pressure side 10b of the valve, the pressure at the outlet side 10a will also tend to increase. Such pressure increase is communicated via passages 25 and line 27 to chamber 24, the increased pressure acting against the diaphragm to move valve 12 in a closing direction until the pressure at 10a is reduced to normal. This normal pressure will of course vary in accordance with the position of valve 12 as determined by the downward pressure on the diaphragm 19. The latter is weighted in a suitable manner, as for example by means of one or a plurality of metal disks 30, to maintain a predetermined downward pressure on the diaphragm tending to open the valve. The weight on the diaphragm may be adjusted relative to the pressure applied to its under side, so that assuming the gas pressure in chamber 31 to be relieved, valve 12 will remain slightly open to a position that will establish a predetermined minimum pressure on the fuel being supplied at the outlet side 10a to the boiler burners. In this manner, when the boiler steam pressure has built up to the maximum which the pilot valve is set to maintain, the gas supplied to the burners will not be entirely cut off, but will be continued at a slow rate under predetermined minimum pressure.

Diaphragm 19 and valve 12 are controlled and caused to operate in response to variations in the boiler steam pressure by way of a pilot valve assembly generally indicated at 32, and to which the boiler steam pressure is communicated via line 33. The pilot valve assembly comprises a body made up of sections 34, 35 and 36 which may conveniently, though not necessarily, be mounted directly on the main diaphragm casing by threading the lower end of body section 34 into the top wall 22 of the diaphragm casing, as illustrated. A pair of spaced diaphragms 37 and 38 are clamped between the pilot valve body flanged portions that are held together by bolts 39 and 40. The two diaphragms form with the wall of body section 35, an annular closed reference pressure chamber 41 with which the steam pressure line 33 communicates. Diaphragms 37 and 38 are separated by a tubular flanged spacing member 42 through which extends a tube 43 threaded at its upper end into the bore of plate 44, and having at its lower end a flange 45 bearing against ring 46. In this manner the diaphragms are clamped between the flanged spacing member 42, plate 44 and ring 46; and the entire assembly, including tube 43, is supported by the diaphragms so as to be vertically movable with the diaphragms.

By reason of the area differential of the two diaphragms 37 and 38, the diaphragms and the parts carried thereby are vertically movable in response to pressure changes in chamber 41. Upward movement of the diaphragm assembly is yieldably resisted by spring 51, and a pressure increase in chamber 41 raises the assembly against such resistance. Upon a reduction of pressure in chamber 41, the yieldable resistance tends to move the assembly downward. Vertical movement of the diaphragm supported parts above and below the intermediate positions shown in Fig. 1, is limited by the engagement of plate 44 with the body shoulder 47, and the engagement of the lower end of tube 43 with shoulder 48 within the lower body section 34.

Plate 44 carries an inverted cup-shaped member 50 which forms a seat for coil spring 51 bearing at its upper end against a supporting plate 52, which in turn is supported by an adjustable hollow screw 53 threaded through plug 54 in the upper end of the body. Bearings 55 are provided to permit adjustment of screw 53 and the compression of spring 51, without rotating the spring support 52. The cap 56 may be provided to prevent entry of moisture and dirt to the interior of body section 36. Any moisture that might enter the body through screw 53 or elsewhere, is permitted to drain out through a lateral passage 57 drilled closely above the diaphragm 37.

Figure 3:
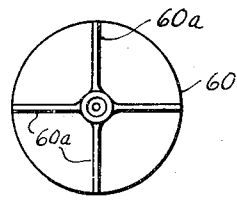
Fig. 3 is a bottom view of one of the pilot valve seats, as indicated by line 3—3 of Fig. 2.

Plate 44 has a center bore forming chamber 58 closed by a diaphragm 59 clamped in place by threading the inverted cup-shaped member 50 into a counterbore in plate 44, as illustrated. Diaphragm 59 carries a disk 60 clamped to the diaphragm by a nut 61 threaded on the reduced central portion 62 of the disk extending upwardly through the diaphragm and drilled to provide a gas relief passage 63. Disk 60 normally seats upon surface 64 of plate 44, and provision is made for communicating gas pressure through the bore of tube 43 to the under side of diaphragm 59, by forming radial ribs 60a (see Fig. 3) on the under side of disk 60. Upward movement of disk 60 from engagement with the plate surface 64 is yieldably resisted by coil spring 65 bearing against the lower end of screw 66 threaded through the top wall of member 50 and extending upwardly within the hollow screw 53. Screw 66 may be adjusted to vary the resistance offered by spring 65 to upward movement of disk 60 from seating position, and also to predetermine the amount of pressure acting upwardly against disk 60 and diaphragm 59 required to raise the disk from its seat. Screw 66 may be provided with a passage 67 through which gas released through passage 63 into chambers 68 may be vented into the interior of body section 36, and thence through opening 57 to the atmosphere.

The main diaphragm 19 is actuated to operate the valve 12 by actuating gas pressure communicated to the actuating pressure chamber 31 under control of the pilot valve 32, from line 70, which it will be understood may connect with any suitable source of what may be termed pressure or operating fluid. In an installation such as I have illustrated, line 70 may conveniently be connected to the gas line 10 at the high pressure side of the valve 12. A valve 71 may be provided in line 70 to sufficiently restrict the communication of pressure to the diaphragm chamber to avoid pressure pulsations against the diaphragm due to sudden pressure changes in the gas line. The delivery of actuating pressure fluid from line 70 to the diaphragm chamber 31 to open the valve 12, and the release of pressure from chamber 31 to permit the valve to close, are controlled by an elongated valve 72 extending through the diaphragm carried tube 43. The upper pointed end 73 of the valve controls the release of gas through passage 63 in disk 60, and the lower enlarged end 74 of the valve, normally held against its seat 75 by coil spring 79, controls the flow of gas from line 70 into chamber 31 by way of clearance space 76 between the stem portion of the valve and seat 75, chamber 77, and passage 78. The length of valve element 72 is such that when diaphragms 37 and 38, and the parts carried thereby, are in their normal illustrated positions, disk 60 will seat against the needle valve 73 to close passage 63, and valve 74 will engage its seat 75 to close off the supply of gas from line 70 to the diaphragm chamber.

Upon downward movement of the assembly supported by diaphragms 37 and 38, the valve element 72 is moved downward by disk 60 against resistance of spring 79, unseating valve 74 and permitting gas from line 70 to enter the diaphragm chamber 31. Reversely, as the diaphragm supported parts move upwardly, disk 60 is raised from engagement with the needle end 73 of the valve (valve 74 remaining seated), releasing gas from chamber 31 through passage 78, chamber 77 and the clearance space 80 between the valve element 72 and tube 43. Disk 60 also is movable upwardly away from the valve 73 independently of upward movement of the diaphragms 37 and 38, when the gas pressure in chamber 81 below diaphragm 59 increases to the point of overcoming the resistance offered by spring 65. It will be seen that the relationship between the valve element 72 and the diaphragm supported assembly is such that the slightest downward movement of the diaphragms 37 and 38 below their normal illustrated positions will cause valve 74 to unseat, and that the slightest upward movement of the diaphragms will raise disk 60 from engagement with the upper end 73 of the valve. In this way the operation of the pilot valve, and the control of pressure in the main diaphragm chamber 31, are made extremely sensitive to variations in the steam pressure communicated to chamber 41.

In describing the operation of the system, it may be assumed that the boiler steam pressure corresponds to the maximum which the pilot valve is set to maintain, as determined by the resistance to compression offered by spring 51. An increase in the boiler steam pressure above this maximum results in upward deflection of diaphragms 37 and 38 due to the increase in the pressure differential on the diaphragms. The corresponding upward movement of plate 44 raises disk 60 from engagement with valve 73, releasing gas from the diaphragm chamber 31 through the previously described passages, and venting the gas to the atmosphere through opening 57 in the body section 36. As a result of the pressure decrease in the chamber 31, valve 12 is moved in a closing direction to reduce the rate of gas flow through line 10 to the burners. The release of pressure on the diaphragm 19 by the pilot valve occurs only for an instant, since immediately upon the reduction of pressure in chamber 77, spring 51 will return the diaphragm supported parts to their normal position in which disk 60 again seats against the needle valve 73.

Assuming now the steam pressure in chamber 41 to decrease below that which the pilot valve is set to maintain, the resultant downward deflection of diaphragms 37 and 38, and corresponding downward movement of disk 60, unseats valve 74, permitting the entry of gas from line 70 to the diaphragm chamber 31. The resultant increase in pressure against the main diaphragm 19 moves valve 12 in an opening direction, increasing the rate of gas supply to the boiler burners. Again, valve 74 remains open only for a brief time, since the pressure increase in chamber 77 will return the parts to their normal positions in which valve 74 will be seated by the action of spring 79.

The capacity of disk 60 for independent upward movement relative to plate 44 as a result of a predetermined pressure increase in chamber 81, provides a means of limiting the maximum pressure of the gas supplied to the burners independently of the boiler steam pressure. Thus, assuming the steam pressure to drop, the regulator will then automatically increase the gas supplied to the burners, but at the same time it will limit the burner gas supply pressure to a predetermined maximum. When valve 74 unseats to admit gas from line 70 to the diaphragm chamber in response to a pressure decrease in chamber 41, as previously explained, the gas pressure in chamber 81 acting against diaphragm 59 will increase corresponding to the pressure increase in the main diaphragm chamber 31. Spring 65 is set to maintain a predetermined seating pressure on disk 60, and in the event the pressure in chamber 81 exceeds the spring resistance, disk 60 unseats to release gas through passage 63, thus limiting the pressure on diaphragm 19, the maximum opening position of valve 12, and the pressure of the outlet burner supply gas.

Figure 4:
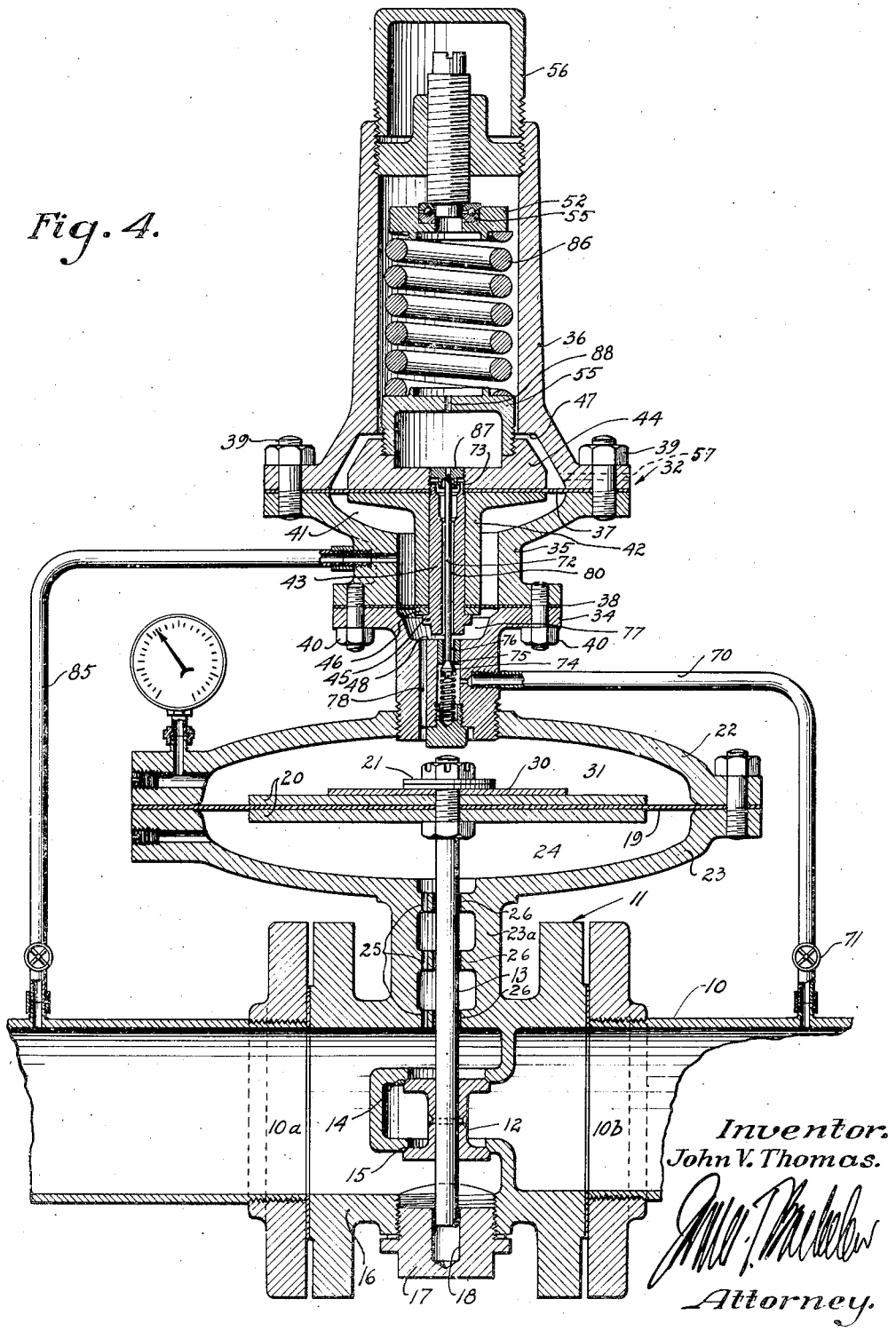
Fig. 4 is a sectional view similar to Fig. 1, showing a variational form of the invention.

In Fig. 4 I show a variational form of the invention embodied in a more simple form of regulator for maintaining in a valve controlled gas line, a constant pressure at the outlet side of the valve. The general construction and mode of operation of this variant form are similar to the described boiler gas supply regulator, except that certain parts, such as the maximum burner pressure control adapting the first described form to its particular purpose, have been omitted. In Fig. 4 parts similar to and performing the same functions as the parts in the first described form, are designated by corresponding reference numerals. Since it is the purpose of the regulator in Fig. 4 to maintain constant the gas pressure in the outlet 10a, chamber 41 is connected with line 10 at the outlet side 10a of the valve by line 85. The particular constant gas outlet pressure which the pilot valve is set to maintain, is determined by adjustment of spring 86 which performs the functions of spring 51 in the previously described form. The upper end 73 of the valve element 72 is engaged by a seat 87 carried directly by plate 44, upward movement of the seat from the valve releasing gas through port 88 to the atmospheric vent 57.

As gas pressure in the outlet 10a tends to increase, the communication of the increased pressure to chamber 41 causes seat 87 to raise from engagement with the valve 73, relieving the pressure in diaphragm chamber 31 and thereby causing the valve 12 to close slightly, the valve closing pressure on the diaphragm 19 being communicated to chamber 24 through passages 25. When the pressure in the outlet 10a decreases, the lowering of pressure in chamber 41 causes spring 86 to depress the diaphragm supported parts, opening valve 74 to permit delivery of gas from line 70 to chamber 31 to the point to which the increased pressure on the diaphragm 19 will open the valve 12 to the extent required to restore the gas pressure in the outlet 10a to normal.

It is a characteristic and highly advantageous feature of both described forms of the invention, that the pressure in accordance with variations in which the pilot valve responds to control the operation of the main valve is communicated to a closed space (chamber 41) between diaphragms, and from which no escape of gas can occur. This same arrangement avoids any necessity for the use of stuffing boxes or other such means ordinarily required to seal relatively moving parts of regulators against gas leakage. The invention has the further advantage of providing in a relatively simple and compact regulator, controls for a number of individual conditions, all as explained in the foregoing, with each control capable of precision operation within close limits.

I claim:

1. A pilot valve mechanism including an operating member movable in opposite directions, conduit means leading from a source of fluid pressure and including a stationary valve orifice and seat, a yielding pressure responsive member carried by said movable operating member and exposed to the fluid pressure in said conduit to be moved thereby relative to the operating member, a venting valve orifice and seat carried by said pressure responsive member, a valve member cooperating with and adapted to seat upon both said valve seats and adapted to be unseated from one or the other as said operating member moves in one direction or the opposite, and means for applying to said yielding pressure responsive member an adjustably variable yielding force opposing its movement by fluid pressure.

2. A pilot valve mechanism including a chambered body, two spaced pilot diaphragms of different areas enclosing between them in said body a reference pressure chamber and one of said diaphragms forming with said body a separate actuating-fluid pressure chamber, structure including a pressure responsive diaphragm forming a fluid pressure chamber carried by the other of said pilot diaphragms, conduit means leading from said actuating-fluid pressure chamber, a fluid pressure passage in the body leading to said actuating-fluid pressure chamber and including a valve orifice and seat, a tubular member carried by and extending through said two pilot diaphragms and the chamber between them and having one end open to said actuating-fluid pressure chamber and the other end open to said diaphragm-carried chamber, means carried by said pressure responsive diaphragm forming a valve seat and a venting orifice, means for applying to said pressure responsive diaphragm an adjustable force opposing its pressure responsive movement, and a valve member extending through said tubular member and having parts co-operating with and seating upon each of said valve seats and adapted to be unseated from the first mentioned seat by movement in one direction and from the second mentioned seat by movement of that seat in the opposite direction.

3. A pilot valve mechanism including an operating member movable in opposite directions, a relatively stationary valve seat, a valve seat carried by said movable operating member, conduit means leading from a source of fluid pressure and including one of said valve seats, a venting conduit means leading from said operating member and including the other of said valve seats, a valve member cooperating with both said valve seats and operated by movement of said movable operating member in one direction to lift from one of said valve seats and by movement in the opposite direction to lift from the other of said valve seats, and pressure responsive means associated with the valve seat which is in the venting conduit, said pressure responsive means being movable relative to said operating member for allowing said valve seat to disengage said valve member at a predetermined pressure.

JOHN V. THOMAS.